Patented Nov. 2, 1937

2,097,440

UNITED STATES PATENT OFFICE 2,097,440

PROCESS FOR PURIFYING MAHOGANY SOAP

Manuel Blumer, Butler, Pa., assignor to L. Sonneborn Sons, Inc., a corporation of Delaware No Drawing. Application October 16, 1934, Serial No. 748,453

4 Claims. (Cl. 260—159)

This invention relates to a process of purifying mahogany soap and more especially to the preparation of mahogany soap substantially free of inorganic impurities.

Mahogany soaps are obtained from different sources, for example, as a by-product in the refining of a mineral oil in the preparation of a medicinal white oil. The mineral oil is treated with sulphuric acid or oleum to remove from the oil the unsaturated components thereof. These unsaturated components react with the sulphuric acid or oleum to form water soluble sulfonic acids which are soluble in the acid sludge, and oil soluble sulfonic acids which are soluble in the oil layer. The oil layer containing the mahogany sulfonic acids is separated from the acid sludge, the sulfonic acids are neutralized, and the soaps formed are extracted from the oil by means of a water soluble organic solvent, such as an aqueous alcohol solution.

It has been the practice to distill off the organic solvent and water, to obtain the crude soaps. Such crude materials contain relatively large amounts of inorganic impurities, for example, sodium sulphate, sodium sulphite, ferrous and ferric sulfate, sodium chloride, etc. These salts are very objectionable, and if the soaps are used as emulsifying agents, the salts will affect the stability of the emulsions.

In many cases sufficient inorganic impurities are not removed to permit the use of the soaps as emulsifying agents. It has been suggested that a water soluble inorganic salt be added to a soap dissolved in a water soluble organic solvent to throw the soap out of solution, or "salt" it out. Such "salted out" soap still contains relatively large amounts of the inorganic salt, which is dissolved in the aqueous solution of the organic solvent and in the "salted out" soap layer. Upon distillation of the soap layer, the inorganic salt is precipitated as a finely divided solid and remains mixed with the soap.

I have discovered that mahogany soaps containing less than 1% of inorganic salts may be obtained by forming a mixture of such soap containing a substantial amount of inorganic impurities, water, an alcohol containing not more than three carbon atoms, and sufficient alkalimetal hydroxide to cause separation of the mixture into a first liquid phase consisting principally of mahogany soap, alcohol and some water, and a second liquid phase consisting principally of alkali-metal hydroxide, water, alcohol and said inorganic impurities.

The solid soap, solid alkali-metal hydroxide, alcohol, and water may be mixed together as such, or the alkali-metal hydroxide, either solid or in aqueous solution, may be added to a solution of the soap in alcohol. The alkali-metal hydroxides according to this invention include sodium hydroxide, potassium hydroxide, ammonium hydroxide, and other substances capable of reacting with any of the components of the mixture to form such hydroxides, such as sodium peroxide. The mount of alkali or amount and concentration of its solution may vary within wide limits and will depend upon the type of alkali, the amount of soap in solution, and the type of alcohol used. In solution, a concentration of from 2.5% to 20% or more, and preferably about 4 or 5% by weight, gives good results.

The invention may be carried out by adding, with vigorous agitation, aqueous alkali to a solution of mahogany soap in an alcohol of not more than three carbon atoms. If desired, the mixture may be heated to an elevated temperature, preferably above 100° F. and below the boiling point of the alcohol to obtain intimacy between the two solutions. The resulting mixture is then permitted to settle, forming a clear upper soap layer, and a lower aqueous alkali layer. The soap layer is removed and may be used as such, or may be distilled to obtain the mahogany soap substantially free from inorganic salts, that is, it contains less than 1% of such salts, and is well suited as an emulsifying agent.

The following examples illustrate methods of carrying out my invention but it is understood that these methods are merely illustrative and not limitative.

Ten volumes of a 20% by weight solution of mahogany soap in 50% aqueous ethyl alcohol are mixed with two volumes of a 5% aqueous sodium hydroxide and vigorously agitated. If desired the agitation may be accompanied by heating at about 100° F. for about an hour. The mixture is then allowed to stand for from 12 to 24 hours, separating into two layers, the clear upper layer being about 30% of the total volume of the layers and containing mahogany soap, alcohol and some water. The lower layer contains water, sodium hydroxide, inorganic impurities and alcohol. The upper layer is removed, and may be used as such, or may be distilled, whereby about 50% by weight of the layer is recovered as mahogany soap.

Similar results may be obtained by substituting potassium hydroxide or ammonium hydroxide for the sodium hydroxide.

My invention is not to be limited to any amount or concentration of alkali used. Obviously, however, for best results, the amount of alkali should be such as to cause the soap to pass substantially entirely into one layer. Also, my invention is not limited to any particular type of mahogany soap, nor to the source from which it is obtained.

I claim:—

1. Process of purifying a mahogany soap obtained in the neutralization of acid treated oil and containing inorganic impurities which consists in the steps of forming a mixture of such soap, water, an alcohol containing not more than three carbon atoms, and sufficient alkali-metal hydroxide to cause separation of the mixture into a first liquid phase substantially free from inorganic salts in excess of 1% and consisting principally of mahogany soap and alcohol, and at least one more liquid phase, and recovering said first liquid phase.

2. Process of purifying a mahogany soap obtained in the neutralization of acid treated oil and containing inorganic impurities which consists in the steps of forming a mixture of such soap, water, ethyl alcohol and sufficient sodium hydroxide to cause separation of the mixture into a first liquid phase substantially free from inorganic salts in excess of 1% and consisting principally of mahogany soap and alcohol, and at least one more liquid phase, and recovering said first liquid phase.

3. Process of purifying a mahogany soap obtained in the neutralization of acid treated oil and containing inorganic impurities which consists in the steps of adding to a solution of such soap in an aqueous solution of an alcohol of not more than three carbon atoms, sufficient alkali-metal hydroxide to cause separation of the mixture into a first liquid phase substantially free from inorganic salts in excess of 1% and consisting principally of mahogany soap and alcohol, and at least one more liquid phase, and recovering said first liquid phase.

4. Process of purifying a mahogany soap obtained in the neutralization of acid treated oil and containing inorganic impurities which consists in the steps of adding to a solution of such soap in aqueous ethyl alcohol, sufficient aqueous sodium hydroxide to cause separation of the mixture into a first liquid phase substantially free from inorganic salts in excess of 1% and consisting principally of mahogany soap and alcohol, and at least one more liquid phase, removing said first liquid phase, and recovering said mahogany soap.

MANUEL BLUMER.